United States Patent
Lust et al.

(10) Patent No.: US 6,592,356 B1
(45) Date of Patent: Jul. 15, 2003

(54) MOLD, MOLDING SYSTEM AND MOLDING MACHINE FOR MAKING OPHTHALMIC DEVICES

(75) Inventors: Victor Lust, Jacksonville, FL (US); Philip K. Parnell, Jacksonville, FL (US); Kornelis Renkema, Nuenen (NL); Jan van Lievenoogen, Hyethuysen (NL); Will van Kraay, Eindhoven (NL)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/305,886

(22) Filed: May 5, 1999

(51) Int. Cl.[7] ............................................. B29D 11/00

(52) U.S. Cl. ............... 425/192 R; 425/556; 425/437; 425/436 RM; 425/808

(58) Field of Search ............................. 425/183, 192 R, 425/436 R, 436 RM, 437, 556, 808; 249/102, 117; 264/2.5, 225

(56) References Cited

U.S. PATENT DOCUMENTS

| | | | |
|---|---|---|---|
| 2,424,235 A | * 7/1947 | Hoffer | 249/102 |
| 3,871,611 A | 3/1975 | Taketa | |
| 3,982,869 A | 9/1976 | Eggers | 425/246 |
| 4,008,032 A | 2/1977 | Pahl | 425/246 |
| 4,091,057 A | 5/1978 | Weber | |
| 4,364,878 A | * 12/1982 | Laliberte et al. | 264/2.2 |
| 4,383,672 A | 5/1983 | Kreuttner | |
| 4,565,348 A | 1/1986 | Larsen | 249/122 |
| 4,600,372 A | 7/1986 | Barouh et al. | 425/128 |
| 4,640,489 A | 2/1987 | Larsen | 249/122 |
| 4,761,069 A | * 8/1988 | Truong et al. | 351/160 H |
| 4,782,946 A | 11/1988 | Pollak | 206/223 |
| 4,933,119 A | * 6/1990 | Weymouth, Jr. | 264/1.1 |
| 5,252,056 A | 10/1993 | Horner et al. | 425/555 |
| 5,316,463 A | 5/1994 | Neu | |
| 5,451,155 A | 9/1995 | Kok et al. | 425/183 |
| 5,466,147 A | 11/1995 | Appleton et al. | 425/412 |
| 5,512,221 A | * 4/1996 | Maus et al. | 264/2.5 |
| 5,540,410 A | 7/1996 | Lust et al. | 249/134 |
| 5,540,543 A | 7/1996 | Lust et al. | 414/786 |
| 5,545,366 A | 8/1996 | Lust et al. | 264/225 |
| 5,560,939 A | 10/1996 | Nagakawa et al. | |
| 5,593,620 A | 1/1997 | Galas | 264/1.1 |
| 5,601,759 A | 2/1997 | Apollonio | 264/2.5 |
| 5,611,970 A | 3/1997 | Apollonio et al. | 264/2.5 |

(List continued on next page.)

FOREIGN PATENT DOCUMENTS

| | | | |
|---|---|---|---|
| DE | 29723514 | 10/1998 | |
| EP | 0447361 A | 9/1991 | |
| EP | 0 577 169 A1 | 1/1994 | B29C/45/17 |
| EP | 0979725 A | 2/2000 | |
| GB | 650692 A | 2/1951 | |
| GB | 1032412 | 6/1966 | |
| GB | 1032414 A | 6/1966 | |
| GB | 2189182 | 10/1987 | |
| JP | 0048310 | * 3/1985 | |
| JP | 61272120 | 12/1986 | |
| WO | WO 96/24074 | 8/1996 | G02B/1/04 |
| WO | WO 98/42497 | 10/1998 | B29D/11/00 |
| WO | 0038899 A | 7/2000 | |

OTHER PUBLICATIONS

PCT International Search Report PCT/US02/27487 dated Dec. 11, 2002.
PCT Search Report for EP 00 30 3762.

*Primary Examiner*—James P. Mackey
*Assistant Examiner*—Donald Heckenberg
(74) *Attorney, Agent, or Firm*—Anne B. Kiernan

(57) ABSTRACT

This invention provides a mold comprising a first mold half which works in conjunction with a second mold half for forming ophthalmic devices wherein said first mold half comprises at least one changeable cassette comprising inserts for forming said ophthalmic devices. The mold is particularly well-suited for use in an injection molding machine.

66 Claims, 8 Drawing Sheets

U.S. PATENT DOCUMENTS

| | | | |
|---|---|---|---|
| 5,620,717 A | 4/1997 | Wickes et al. | 425/175 |
| 5,639,510 A | 6/1997 | Kindt-Larsen et al. | 427/133 |
| 5,658,602 A | 8/1997 | Martin et al. | 425/346 |
| 5,702,735 A | 12/1997 | Martin et al. | 425/548 |
| 5,706,634 A | 1/1998 | Edwards et al. | 53/473 |
| 5,716,540 A | 2/1998 | Matiacio et al. | 249/117 |
| 5,750,060 A | 5/1998 | Maus et al. | |
| 5,782,460 A | 7/1998 | Kretzschmar et al. | 264/1.36 |
| 5,861,114 A | 1/1999 | Roffmann et al. | |
| 5,935,492 A * | 8/1999 | Martin et al. | 264/1.37 |
| 5,982,565 A | 11/1999 | Nomura et al. | |

* cited by examiner

MOLD, MOLDING SYSTEM AND MOLDING MACHINE FOR MAKING OPHTHALMIC DEVICES

FIELD OF THE INVENTION

The present invention relates generally to a mold and/or a molding machine for making ophthalmic devices. More particularly, this invention relates generally to a mold and/or a molding machine for making ophthalmic devices with many stock keeping units (SKUs).

BACKGROUND OF THE INVENTION

U.S. Pat. No. 5,702,735 to Martin et al., the entire disclosure of which is hereby incorporated by reference, provides an apparatus for molding polystyrene lens curves, i.e., front curves or back curves, which are used for subsequent molding of soft contact lenses. The apparatus is designed to provide superior heat conduction capacity so as to minimize the molding cycle time, while simultaneously producing uniformly precise and accurate optical quality surfaces. Molten polystyrene is provided via a hot runner system to a plurality of mold cavities. In a mold used to make front curves, the convex surfaces of the mold provide the optical quality surfaces to the concave surfaces of the front curves produced thereby. The structural element which defines each convex surface includes a hollow cylindrical bushing and a removable power insert mounted therein, which may be changed so that the prescription strength of the contact lens to be formed by the lens curves may be varied. In a first embodiment, the power insert includes only a convex surface at its operational end. In a second embodiment, the power insert includes an annular flat surface surrounding the convex surface, defining at the junction therebetween a discontinuity of curvature, which imparts a sharp edge to the front curve formed thereby. Cooling water is pumped into the core of the inserts to cool the inserts during the molding process, which complicates the process of changing the inserts. The power insert may be constructed of various materials including pure steel, brass, copper chromium, or cobalt-nickel alloyed martensitic steel. The power insert may be coated with a surface layer of nickel phosphor or silicone oxide, or chrome nitride. These layers may be turned to their proper thicknesses and dimensions by diamond cutters, and they may be thermally hardened.

U.S. Pat. No. 4,565,348 to Larsen, which is also incorporated by reference, discloses another prior art approach to manufacturing lens curves. Pursuant to this prior art approach, the lens curves are molded as a set of eight lens curves carried on a frame in a 2×4 array. FIG. 3 of the Larsen patent illustrates a molded frame carrying a 2×4 array of concave front curves, while FIG. 5 therein shows a molded frame carrying a 2×4 array of back curves. The cluster assembly of the frame and lens curves is manufactured by injection molding the assembly as one piece with the lens curves being secured within an outer rectangular frame by small struts extending between the frame and the lens curves. The height of the frame is such that the surfaces of the lens curves are protected from scratching and mechanical damage during handling, and the frame in general has a shape facilitating stacking and handling. This prior art approach of molding such polystyrene lens curves in a cluster assembly typically takes approximately twenty-four (24) seconds, which is too long for the efficient production of such polystyrene lens curves.

In this prior art approach, complementary sets of front and back curves are used in the production of hydrogel contact lenses by molding a reaction mixture wherein the mixture is preferably dissolved in a non-aqueous, water-displaceable solvent. After a dosing step in which the front curves are substantially filled with the reaction mixture, the concave front curves are covered with the back curves in a manner in which no air bubbles are trapped beneath the back curves. Back curves are placed on the polymerizable mixture in the front curves as individual units; therefore, prior to this step, the back curves are separated from their frames by breaking or cutting. The back curves are preferably held by a mechanical device while they are separated from the frame which thereafter places the back curves on the front curves. The reaction mixture is then subjected to conditions whereby it polymerizes, e.g. irradiation with actinic visible or ultraviolet radiation, to thereby produce a polymer in the shape of the desired hydrogel lens. After the polymerization process is completed, the two lens curves are separated (called demolding); typically leaving the contact lens in the front curve, from which it is subsequently displaced. Typically the front and back curves are used once to mold a single contact lens. After the polymerization is complete, the diluent is displaced with water to produce a hydrated lens.

U.S. Pat. No. 5,782,460, and WO 98/42497 disclose a method of making hydrogel contact lenses by molding a material which has been polymerized but is at least partially uncrosslinked within reusable molds. Crosslinking of the polymer is by UV radiation; therefore, the mold consists of a UV-permeable material, such as quartz, or polymeric materials. One or more contact lenses can be molded in each mold tool.

U.S. Pat. No. 5,451,155 to Kok et al., the entire disclosure of which is hereby incorporated by reference, discloses an arrangement for manufacturing goods, such as compact discs, by injection molding, providing a vertical injection molding machine including two holders that support mold plates. The mold plates are adjustable with respect to each other between a first position, in which the molding plates define a cavity, into which material is injected by the injection molding machine during operation, so that the particular molded good is formed, and a second position, in which the molding plates have been moved some distance apart, while the formed good is being removed. On each side of the injection molding machine, transport devices are provided which move the holder and molding plates from a position located at some distance from the injection molding machine to a position suitable for cooperation with the injection molding machine. The transport devices and the holders are detachably coupled. It is also disclosed that a holder may be provided with a new molding plate at some distance from the machine while the machine is in operation. For exchanging the molding plates and holders, it is only necessary to discharge the holder supporting the molding plate used so far, and to move the new holder and molding plate into position. This type of exchange of molding plates provides for a quick and simple retooling while minimizing the downtime of the injection molding operation.

There is a need in the art to improve the molds and molding technology for making ophthalmic devices, particularly for ophthalmic devices with many stock keeping units (SKUs). The term "stock keeping units" refers to different devices, e.g. different products. For example, contact lenses having different powers, and/or cylinders and/or axis values each combination of which would represent a different SKU, each SKU being manufactured using different molds or a different orientation of the molds or different reactive mixtures within the molds.

SUMMARY OF THE INVENTION

This invention provides a mold and a molding system comprising a mold comprising a first mold half which works in conjunction with a second mold half for forming ophthalmic devices wherein said first mold half comprises at least one changeable cassette comprising inserts for forming said ophthalmic devices. This mold can be used to make ophthalmic devices; however, this mold is preferably used in an automated molding machine, more preferably in an injection molding machine. This invention is preferably used to make lens curves which are in turn used to make contact lenses.

This invention further provides a vertical injection molding machine comprising a mold, preferably having at least one cassette, in which the machine can quickly change one mold half for another, and the machine is capable of making ophthalmic devices.

This invention further provides a mold in which two different optical quality ophthalmic devices are made in a single mold.

The molds and molding system comprising a mold of this invention make it possible to quickly change the optical characteristics of the ophthalmic devices, which are produced using the molds of this invention. The molds comprising one or more cassettes make it possible to quickly change the cassette(s) thereby making it possible to efficiently make ophthalmic devices with many stock keeping units (SKUs) using one or a small number of mold halves comprising changeable cassettes. These molds are particularly suited for directly or indirectly producing contact lenses having many spherical powers, aspherical powers or multifocal powers.

Accordingly, it is a primary object of the present invention to provide an improved mold and moldingsystem comprising a mold comprising a first mold half and a second mold half wherein said first mold half comprises at least one changeable cassette comprising multiple inserts for forming ophthalmic devices. The first mold half and the second mold half are adjustable with respect to each other between a first position, in which the mold halves form a mold cavity into which a material can or has been introduced so as to form molded ophthalmic devices, and a second position, in which the mold halves have been moved some distance apart preferably while means are provided for removing the molded ophthalmic devices and a second position, in which the mold halves have been moved some distance apart preferably while means are provided for removing the molded ophthalmic devices.

One embodiment of the invention provides a mold half comprising one or more changeable cassettes having inserts that are cooled indirectly; thereby making it easier to remove and interchange the cassette(s).

Another embodiment of the invention improves the removal of the molded ophthalmic devices from the mold by providing an air ejection system. In contrast to prior art which used ejector pins, air ejection does not distort the ophthalmic device and for the preferred embodiment can be done while the molded ophthalmic devices are at a higher temperature.

Another embodiment of the invention provides a mold and molding system comprising a mold designed such that either one or more of the cassette(s) and/or the mold half or halves comprising the cassette(s) can be changed to provide for a different ophthalmic device or devices, that is, different SKUs. In the preferred application, the ophthalmic devices formed using the mold are front curves and back curves used to make contact lenses. The front curves and back curves are preferably molded in a "family mold" arrangement, which means that both mold halves of the mold include complementary inserts for forming both front curves and back curves (convex protrusions and and concave indentations). One mold half preferably comprises a cassette having inserts for front curves, and another cassette having inserts for back curves. In this embodiment, only one mold half needs to be changed to change the front curves and back curves, or one cassette on the mold half can be changed to change either the front curves, or back curves provided by the mold. Changing one mold half or changing the cassette will change the front curves and/or back curves and will result in the production of lenses of different SKUs produced using the front curves and back curves. This arrangement is possible, because only one surface of the front and back curves has an optically critical side whereas the other side is not optically critical. Thus, if the optically critical sides of the lens curves are formed by the changeable cassette side of the mold, the optical characteristics of the lens curves can be changed without changing both sides of the mold.

Another object is to provide an improved mold for making front curves and back curves having the same wall thicknesses for the front curve and back curve.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

The molds and molding system comprising molds of this invention can be used to make ophthalmic devices, such as, contact lenses, interocular lenses, other types of lenses, and plastic molded parts, e.g., lens curves used for making contact lenses. The preferred use for the molds and molding system comprising molds is to make contact lenses, or plastic molded parts for ophthalmic devices, more preferably plastic molded parts for making contact lenses, most preferably lens curves. The molds and molding system comprising molds will be described for the preferred embodiment; however, this invention is not limited to the embodiment described and can be modified and used to make other ophthalmic devices. For example, the mold and molding system comprising molds of this invention with changeable mold halves and/or changeable cassettes can be used to mold contact lenses by methods described in the prior art, such as in U.S. Pat. No. 5,782,460 and WO/98/42497 incorporated herein by reference. To make the contact lenses, the mold halves can be pivotly hinged as taught in those references.

In the preferred embodiment the mold and molding system comprising molds is used to form "lens curves", i.e. "front curves" and "back curves". In the prior art lens curves, i.e. front curves and back curves have been referred to as molds or mold halves for making contact lenses. The terms "mold" and "mold halves" will not be used herein to describe the lens curves although the lens curves are used for molding contact lenses. The terms "mold" and "mold halves" will be used to describe the mold and the mold half used to form the ophthalmic devices (e.g. lens curves).

Figure 1:
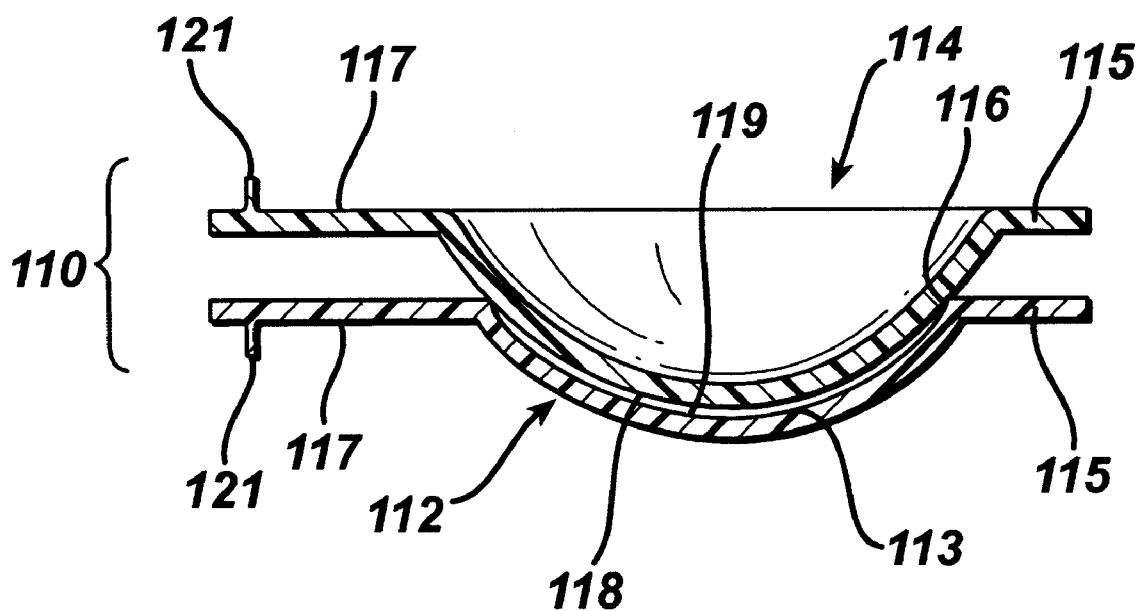
FIG. 1 is a side elevational view of a front curve and back curve assembly, which includes a front curve, and back curve.

FIG. 1 shows the preferred lens curve assembly 110, the individual pieces are made using the mold and molding system comprising molds of this invention. The mold and molding system comprising molds will be described below. The lens curve assembly 110 consists of a front curve 112 and back curve 114 which defines an opening 113 in which a contact lens reaction mixture is polymerized or crosslinked to form a contact lens. The front curve 112 and back curve 114 consist of a plastic material, preferably polystyrene, polypropylene, cycloolefins, or the like, and are made within the first and second mold halves of this invention (described below), preferably in an injection molding machine. The front curve 112 and back curve 114 are similar to those disclosed and used in the prior art to make contact lenses, for example, as described in U.S. Pat. No. 5,545,366, incorporated herein by reference. The front curve 112 has a central curved section with an optical quality concave surface 119 which preferably has a circular circumferential defined edge 116 extending therearound. The concave surface 119 has the dimensions, preferably the power of the front surface of a contact lens to be produced in the lens assembly 110. The front curve has a preferred thickness between 0.2 mm and 1.0 mm; most preferably the thickness is about 0.6 mm.

The back curve 114 has a central curved section with an optical quality convex surface 118. The back curve 114 has the dimensions of the back surface of a contact lens to be produced by the lens assembly 110, and e.g. for a toric lens defines the cylinder power. The back curve 114 has a preferred thickness between 0.2 mm and 1.0 mm; most preferably the thickness is about 0.6 mm. It is preferred that the front curve and the back curve have the same thickness. The front curve 112 and back curve 114 each comprise annular flanges 115, and tabs 117 which are integral with and project from one side of the flanges 115. The front curve 112 and back curve 114 are shown having gate vestiges 121 which sometimes form at the gate or injection hot tip, which supplies molten thermoplastic in the preferred embodiment to the mold used to form the front curve 112 and back curve 114.

The improvements to the front curve and back curve of this invention over prior art front curves and back curves, e.g. as disclosed in U.S. Pat. No. 5,545,366, include a reduction in the volume of plastic used to form the front curve and back curve. The reduction in material was achieved by reducing the size of the tabs 117, and the flanges 115. Also, preferably the thickness of the front curve and back curve is small i.e., less than 0.8 mm, and the same for both lens curves. Further, the preferred front curve and back curve of this invention do not have an area across from the injection hot tip for collecting a small slug of cold thermoplastic which may form at the injection hot tip. The preferred tabs have a flat rounded-triangle shape without a step to break up the flow of the polymer into the mold. The weight of thermoplastic used to form the front curve or back curve is preferably less than 0.5 gm, more preferably less than 0.4 gm, and most preferably less than 0.3 gm. The most preferred weight represents a reduction of about 25% as compared to the prior art front curves and back curves. Preferably the combined weight of the front curve and back curve is less than 0.7 gm. Unexpectedly, by reducing the weight and volume of the thermoplastic material injected to make the lens curves, by decreasing the thickness of the part and the size of the tab, a reduction in the optical quality of the front and back curves did not result. In fact there was an improvement in the quality of the front curves and back curves over the prior art front curves and back curves having a larger weight and volume of thermoplastic material and made having steps, and other molding features to improve the part quality. Further and also unexpectedly, lenses made using the front curves and back curves having the same part thickness, e.g. about 0.6 mm, produced lenses having increased lens quality which would not be predicted by the prior art. Prior to this invention, it was believed that the back curve had to have a smaller thickness than the front curve to provide high quality lenses.

The front curves and back curves of this invention are preferably made using improved molds and injection molding machines, which will be described below. The improvements will be described herein; aspects of the mold or molding process not described herein are as described in U.S. Pat. No. 5,545,366, and U.S. Pat. No. 5,451,155, incorporated herein by reference, or otherwise known to a person of ordinary skill in the art.

Figure 2:
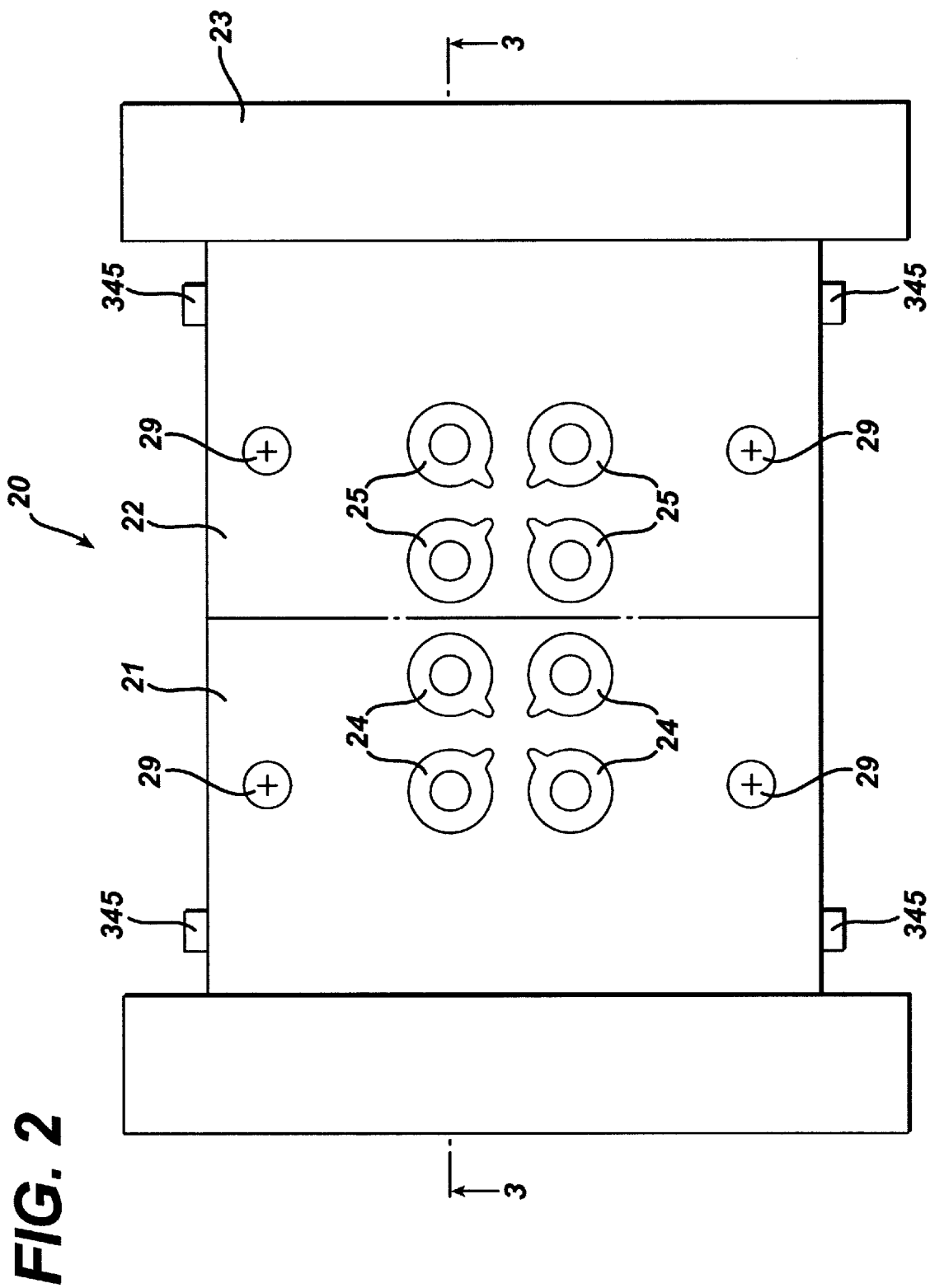
FIG. 2 is a top view of a first mold half.
Figure 4:
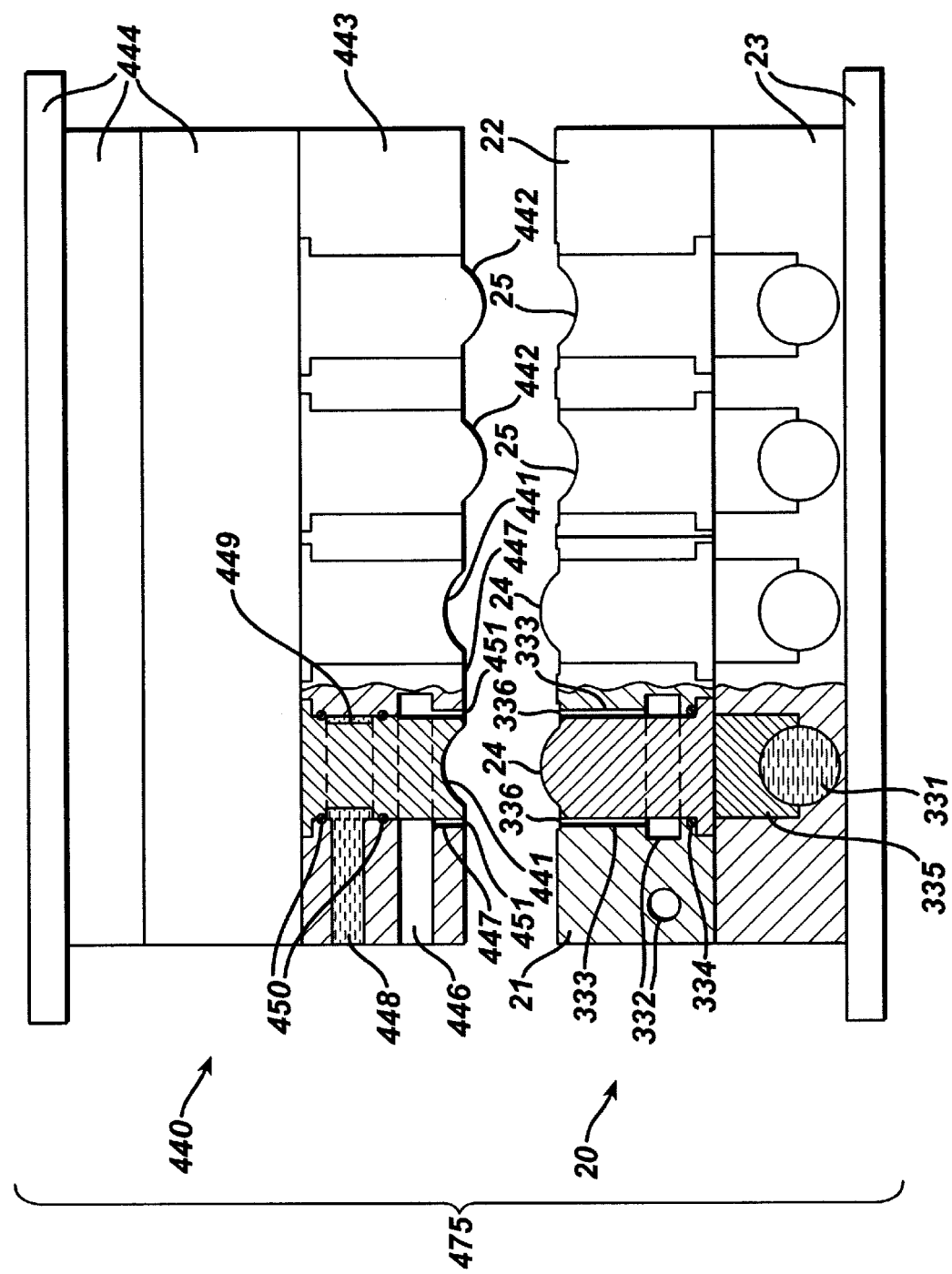
FIG. 4 is a cross-sectional view of a mold shown in the open position; the mold consists of the same first mold half shown in FIG. 3 and a second mold half.

FIG. 2 shows a top view of a first mold half 20 used for molding front curves 112 and back curves 114 in a single mold. (The preferred mold comprising the first mold half 20 and a second mold half 440 is shown in FIG. 4.) The first mold half 20 preferably has two cassettes 21, 22 removably attached to a molding base 23. Depending on the injection molding to be done, there can be one or a plurality of cassettes removably attached to the molding base 23. Preferably there are two or three cassettes, most preferably two cassettes. FIG. 2 shows that the cassettes 21, 22 are removably attached to the molding base 23 by two easily-accessible screws 29 per cassette. Therefore, changing the cassettes on the molding base 23 is a simple and fast task. Alternatively, the cassettes can be attached to the molding base 23 by any means, e.g. brackets, braces, bolts, quick-clamps, and magnetism; however, preferably the means provides for simple and fast removal of the cassette(s) from the molding base. Each cassette preferably has inserted therein a plurality of inserts 24, 25 which receives the thermoplastic material for forming the lens curves. The inserts 24, 25 are preferably individually removable from the cassettes; however, the cassette and inserts can be contiguous if desired. Preferably, each cassette comprises two to twenty inserts, more preferably four to ten inserts. The inserts, sometimes referred to as power inserts may be constructed of any material which can be made with an optical finish, such as metals, e.g., pure steel, brass, copper chromium, or cobalt-nickel alloyed martensitic steel. Alternatively, and particularly for the embodiment in which the mold comprising the inserts makes contact lenses directly, the inserts can comprise quartz, ceramics, or polymeric materials, such as, polycarbonates, cycloolefins, polystyrene, polypropylene, or poly(acrylonitrile).

In the preferred mode, cassette 21 holds front curve inserts 24 for forming (when properly mated with the second mold half 440) the front curve 112, and cassette 22 holds the back curve inserts 25 for forming (when properly mated with the second mold half 440) the back curve 114. The second mold half 440, shown in FIG. 4, has inserts which are complementary to the inserts 24, 25 in the first mold half 20 for forming the front curves 112 and back curves 114, respectively. The first mold half 20 and second mold half 440 are parts of a family mold, which means that more than one type of part is made in a single mold consisting of a first mold half 20 and a second mold half 440. Before this invention, it would be unexpected that optical quality parts could be made in a family mold.

The cassettes preferably comprise metal, such as stainless steel, tool steel, high hardness machinable alloys; however, for an alternative embodiment, polymeric materials can be used to make the cassette. Most preferably nickel-plated tool steel is used to make the cassette. The metal of the cassette is preferably mechanically bored out to form openings to receive the inserts and other channels and passageways for the cooling water and air (described in more detail below) The cassettes preferably weigh less than 12 pounds. The prior art mold halves typically weighed between 100 and 150 pounds, requiring a hoist when it was time to change one or more mold halves in an injection molding machine, and a minimum of thirty minutes to change the mold half. In contrast, the cassettes of this invention are light enough for an operator to handle, and can be removed from a mold half and changed for another cassette in less than 8 minutes, more preferably less than 4 minutes, most preferably less than 3 minutes. In the preferred embodiment, the cassette or cassettes represent a portion of the thermal mass of a mold half, preferably the cassette or cassettes on a mold half are less than 90% of the total mass of the fully assembled mold half, more preferably less than 70%, and most preferably less than 50% of the total mass of the fully assembled mold half. In the preferred embodiment, each cassette represents 20% of the total mass of the fully assembled mold half.

Figure 3:
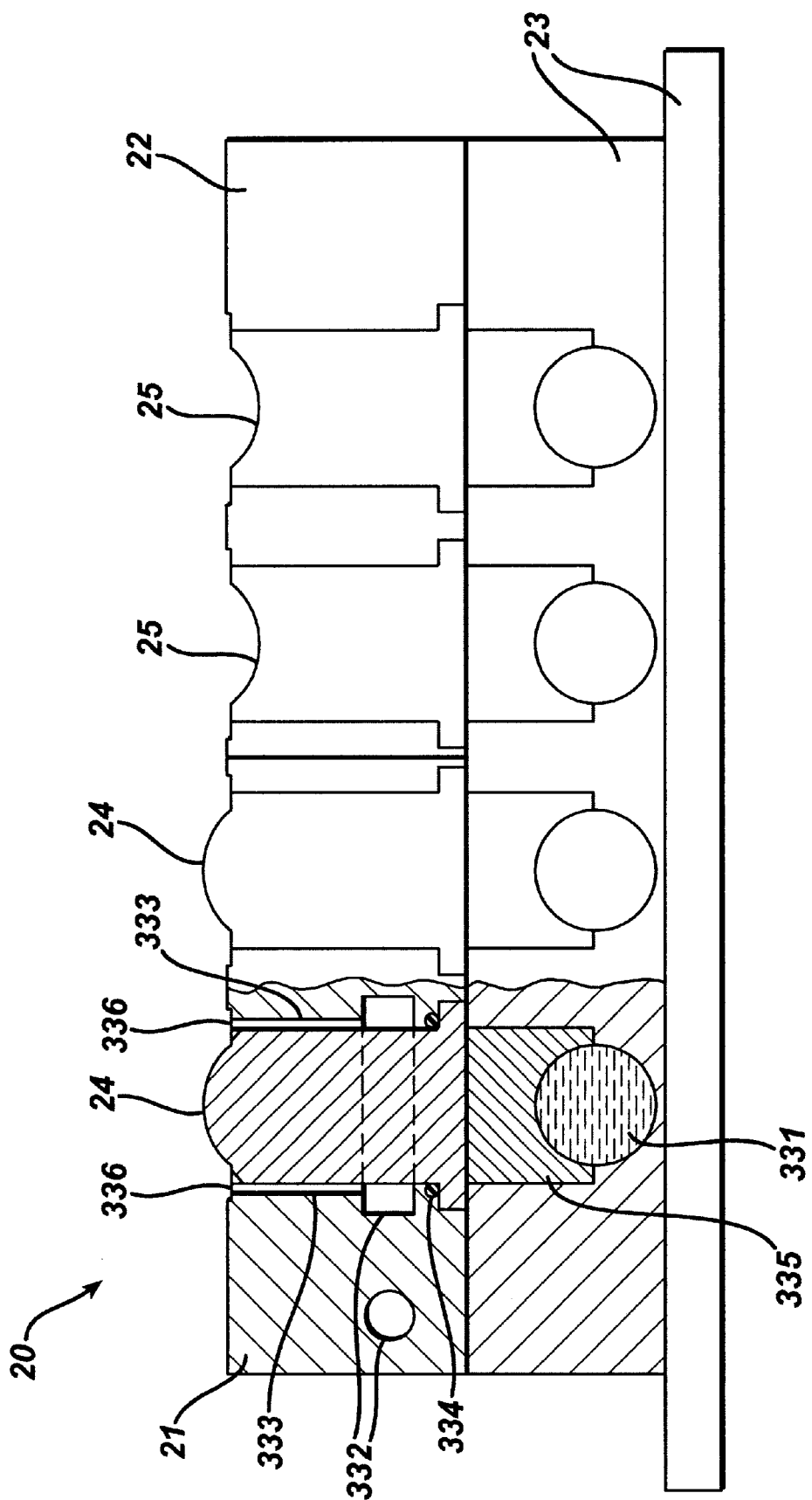
FIG. 3 is a cross-sectional view of the first mold half shown in FIG. 2 taken along the line 3—3 shown in FIG. 2.

FIG. 3 shows the cross-section of the first mold half shown in FIG. 2 taken along line 3—3 shown in FIG. 2. FIG. 3 shows the front curve inserts 24, and the back curve inserts 25 in cassettes 21, 22 respectively. FIG. 4 shows the cross-section of the first mold half 20 and a cross-section of the complementary second mold half 440 which together make the mold 475. FIG. 4 shows the mold consisting of the first mold half 20 and the second mold half 440 in the open position. Where the first mold half 20 has inserts 24 having convex molding surfaces, the second mold half 440 has inserts 441 having concave molding surfaces. Where the first mold half 20 has inserts 25 having concave molding surfaces, the second mold half 440 has inserts 442 having convex molding surfaces. The preferred arrangement is to put the inserts forming the optically critical surfaces 119 of the front curve 112, (see FIG. 1) and/or (preferably and) the optically critical surfaces 118 of the back curve 114 (see FIG. 1) into the one or plurality, of cassettes which are part of the same mold half, preferably the first mold half 20. In the preferred mode, the inserts for the back curves are in one cassette and the inserts for the front curves are in a separate cassette in the first mold half.

The second mold half 440 can comprise changeable cassettes, comprising inserts for critical and/or non-critical surfaces, which are simply and quickly removable from the second mold half; however, in the preferred mode, the second mold half 440 does not comprise cassettes. Instead, the second mold half preferably comprises a plate, frame, or similar support that holds the inserts that form the non-optically critical surfaces of the front curves and/or (preferably and) the back curves. The inserts 441, 442 preferably fit into the plate, frame, or support and are individually removable from the second mold half; however, the inserts may be contiguous with the plate, frame, or support if desired.

In the preferred embodiment, the front curve inserts 441 and the back curve inserts 442 of the second mold half 440 are inserted into a plate 443. The plate 443 preferably comprises a metal of the types described above for the cassette, which has been bored out to the substantially exact dimensions of the inserts 441, 442. The plate 443 is mounted onto the hot runner base 444. The plate 443 and hot runner base 444 have extrusion parts (not shown) for the introduction of molten thermoplastic material into the closed mold for forming the front curves and the back curves, similar to those disclosed and described in the prior art. See e.g., U.S. Pat. No. 5,545,366, earlier incorporated herein by reference. In the preferred mode, the second mold half 440 is preferably mounted into an injection molding machine, and is only occasionally removed for service or insert replacement due to wear or damage, because the inserts form the non-critical surfaces of the lens curves. At that time the plate 443 can be removed from the hot runner base 444 and the inserts 441, 442 can be replaced or the entire plate 443 and inserts 441, 442 can be replaced. Such maintenance will typically require that the injection molding machine stop producing ophthalmic devices for greater than fifteen minutes.

The inserts 441, 442 in the second mold half 440 are cooled by circulating water which travels in conduit 448 through the plate 443 and around the smaller diameter portions 449 of the inserts 441, 442. O-rings 450 maintain the water seal around the inserts 441, 442. (Note that the detail shown for 1 of the 4 inserts on the second mold half 440 pertains to all the inserts 441, 442. Additionally, the detail shown for 1 of the 4 inserts on the first mold half 20 pertains to all the inserts 24, 25, except that the detail for inserts 25 in cassette 22 is a mirror image of the detail for the inserts 24 in cassette 21.) The water preferably flows in a single circuit through the plate 443, contacting all the inserts 441, 442 in each circuit. Because the plate 443 is not often removed from the injection molding machine, direct water cooling of the inserts is preferred, although it complicates insert replacement.

In the first mold half 20 which carries the cassettes 21, 22 is a novel cooling mechanism. Instead of water directly contacting the inserts 24, 25 which would necessitate water seals, complicate, and slow the removal and interchangeability of cassettes, the cooling of the inserts 24, 25 in the first mold half is accomplished using heat transfer blocks 335. The heat transfer blocks 335 are preferably located in the molding base 23. The heat transfer blocks 335 directly contact the inserts 24, 25 when the cassettes 21, 22 are mounted onto or are otherwise attached to the molding base 23. The heat transfer blocks 335 preferably are made of copper, copper chromium, copper zinc, brass, nickel-coated brass, or similar high heat conductive materials. Steel is also a possible choice, but not necessarily preferred. To improve the heat transfer to the molded parts, which need to be cooled, it is also preferred to machine the insert from the enumerated high heat conductive materials. The heat transfer block contacts and preferably is partially formed around a water pipe 331 through which cooling water is pumped preferably in a single circuit back and forth through the molding base 23 containing all the heat transfer blocks 335. Alternatively, the water pipe and cooling blocks can be formed from a single piece of metal. The water pipes 331 cool the cooling blocks 335 which cool the inserts 24, 25. In this way, all the inserts 24, 25 are cooled indirectly by the water. Preferably the heat pipes 331 contain distilled water which is filled under a vacuum. Alternatively, other indirect cooling methods can be used to cool the inserts, e.g. a solid heat pipe with or without cooling fins, or connected to a cooled mass, a heat pipe containing a fluid or refrigerant, with or without cooling fins.

FIG. 3 and 4 show the air ejection system for the removal of the front and back curves from the first mold half 20, and the second mold half 440. In contrast to the use of ejector pins in the prior art, air ejection does not distort the lens curves and can be done while the lens curves are at a higher temperature. The air ejection and decreased material in the front curves and back curves makes it possible to mold the front curves and back curves in a cycle time of less than 6 seconds, more preferably less than 4 seconds, and most preferably in about 2 seconds. The air is ejected at approximately 5 to 6 bar over an area of 2 mm by 100 microns to about 3 mm by 300 microns. The air is ejected through a gap 336, 451 around the circumference of the top of each of the inserts 24, 25, 440, 441. The width of the gap 336, 441 is preferably less than 12 microns. Alternatively, a plurality of holes could have been provided around the circumference at the top of the inserts for air ejection.

For the second mold half 440, air is provided to gap 451 by channels 447 from a passageway 446, which is hooked up to a pressurized air source (not shown). For the first mold half 20, air is provided to gap 336 by channels 333 from passageway 332 which is hooked up to a pressurized air source (not shown).

The channels 333, 447, which connect to passageways 332, 446, are preferably formed by machining multiple grooves into the cassettes 21, 22 and plate 443 around the diameter of the opening to receive the inserts 24, 25, 441, 442. Alternatively, the channels 333, 447 can be machined into the inserts 24, 25, 441, 442.

FIG. 2 shows the connector nozzles 345 which communicate with passageway 332 and can be connected to the air source (not shown) for cassettes 21, 22. When the first mold half 20, having attached cassettes 21, 22 is removed from the molding machine, or if one or both cassettes 20, 21 are removed from the base 23, of the first mold half 20, the air passageway(s) 332 can be readily disconnected from the air source (not shown) via the connector nozzles 345. Preferably the air source to which the connector nozzles 345 is connected, has one or more valves which can be closed or preferably automatically close when the mold half is removed from the molding machine. The cassettes have at least one nozzle, more preferably each cassette has two nozzles 345, one on each side of each cassette. One nozzle 345 is preferably plugged when the other nozzle 345 is attached to the air source.

Preferably air is ejected in a single blast from all of the gaps 451 around the top of the inserts 441, 442 in the second mold half 440 just prior to and as the first and second mold halves change from a closed position to the open position. The single blast of air removes the front curves and back curves from the second mold half 440 so that the lens curves preferentially adhere to or stay on the first mold half 20. After the mold halves are opened, a single blast of air is ejected from all of the gaps 336 around the top of the inserts 24, 25 in the first mold half 20, which removes the front curves and back curves from the first mold half 20. Preferably, the blast of air from the first mold half 20 coincides with the movement of a robot 600 (shown in FIG. 6) to a location between the mold halves to pick up the released front curves and back curves. Alternatively, the process can be reversed to have the front curves and back curves remain on the second mold half 440. Further alternatively, other means may be used to get the lens curves to preferentially adhere to one mold half, e.g., surface treatment of the inserts, an anchoring portion on one surface of the lens curves, or other know ways; however, it is preferred to use air ejection for release on at least one, preferably both, of the mold halves.

Figure 7:
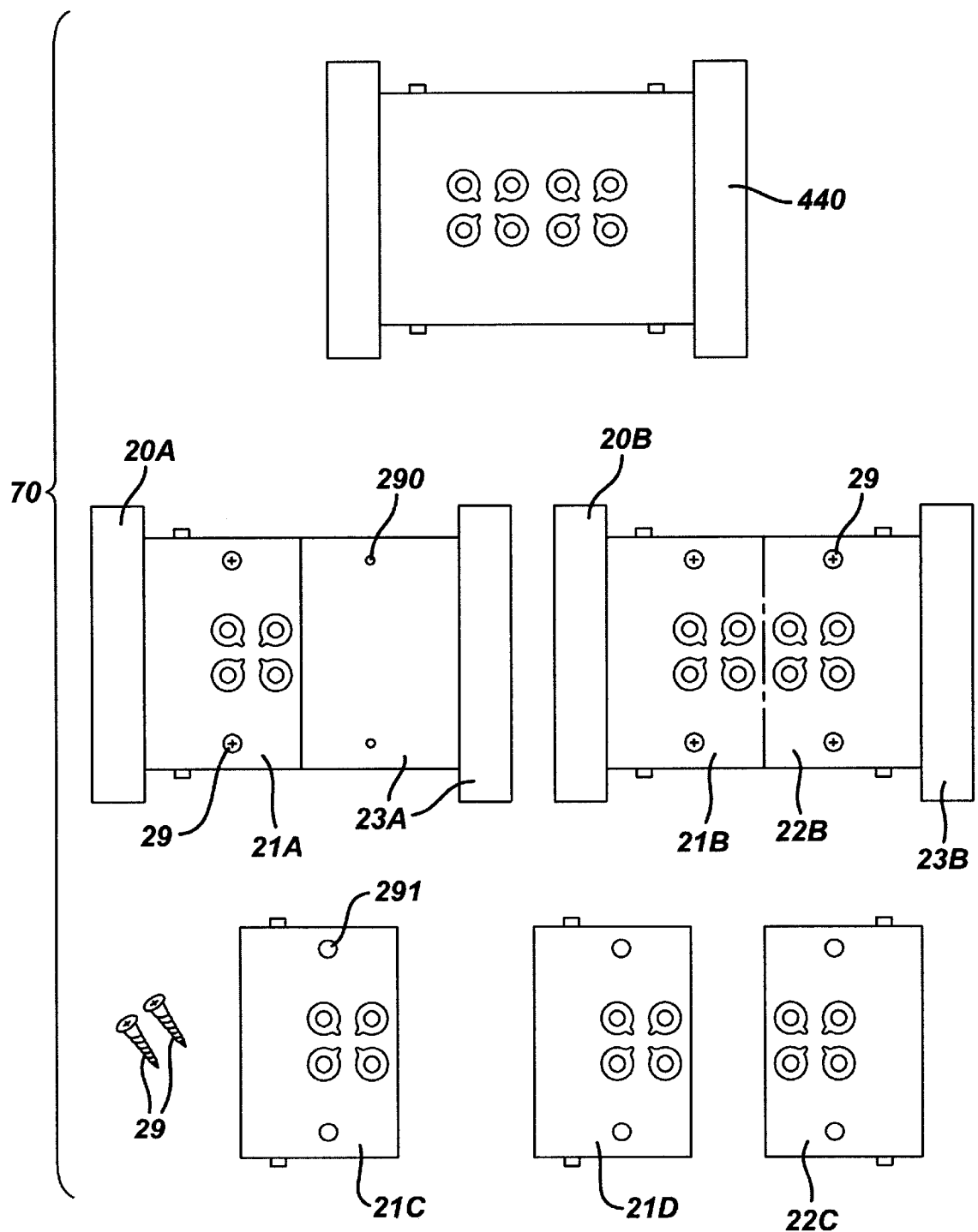
FIG. 7 is a top plan view of each of the components of one embodiment of a molding system of this invention.

FIG. 7 is a top view of a molding system 70 shown consisting of a plurality of mold halves, and a plurality changeable cassettes as were shown in FIGS. 2–4. FIG. 7 shows a second mold half 440, and two first mold halves 20A and 20B. First mold half 20A is shown with one removably attached changeable cassette 21A on a molding base 23A. The molding base 23A shows screw holes 290 for receipt of screws 29 when a second changeable cassette is attached to that base 23A. First mold half 20B is shown with two changeable cassettes 21B and 22B attached to its molding base 23B by screws 29. Three additional changeable cassettes 21C, 21D, and 22C are shown unattached to any molding base. The changeable cassettes 21C, 21D, and 22C can be exchanged for one of the changeable cassettes shown attached to the mold halves 20A and 20B, or attached to the molding base 23A of mold half 20A where no changeable cassette is presently attached. This embodiment provides a plurality of mold halves which can work in conjunction with the second mold half to make differently shaped ophthalmic devices.

Figure 8:
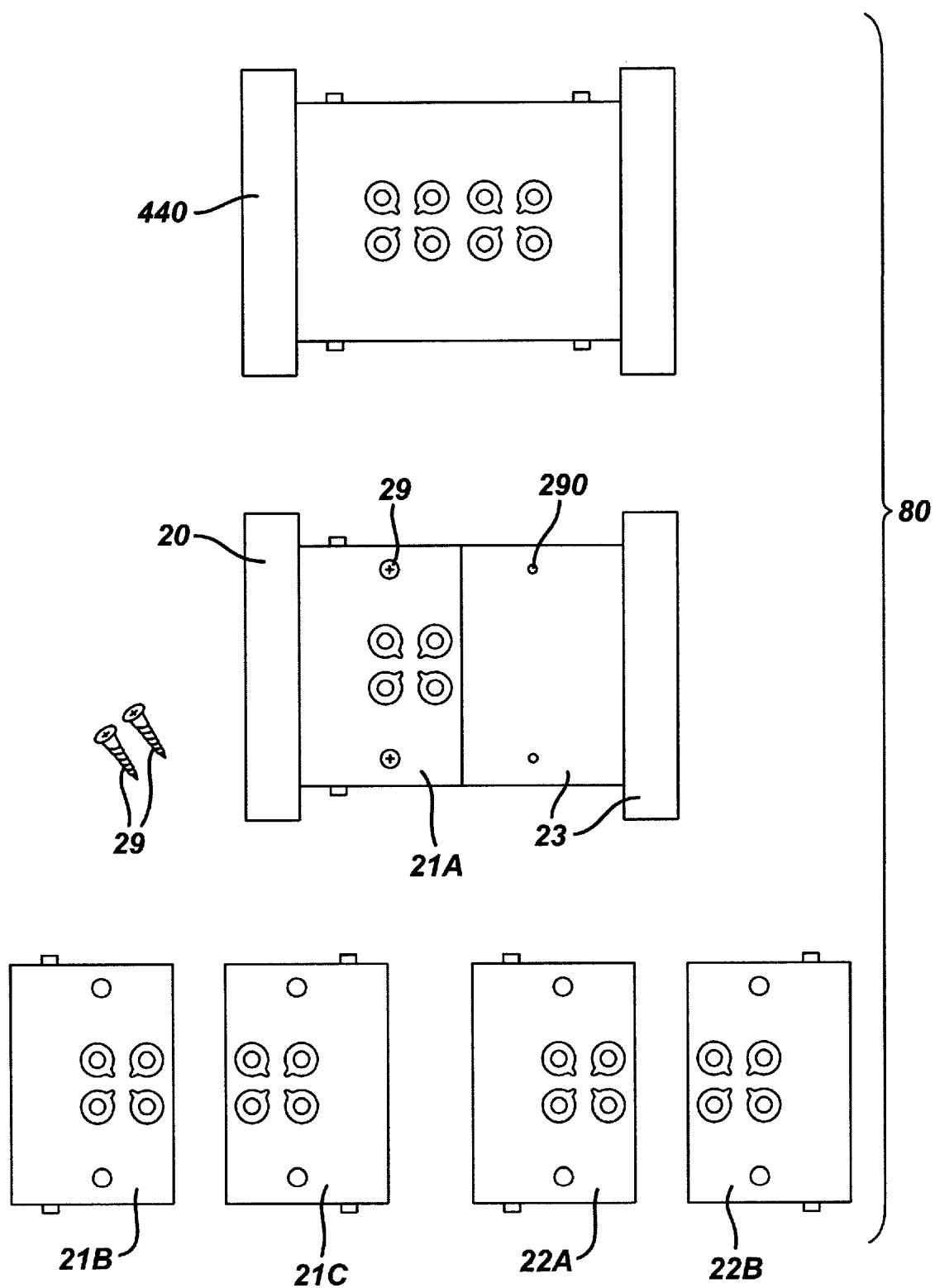
FIG. 8 is a top plan view of each of the components of a second embodiment of a molding system of this invention.

Alternatively, FIG. 8 shows a molding system 80 comprising a mold comprising a first mold half 20 and a second mold half 440, wherein said first mold half 20 comprises two changeable cassettes. First mold half 20 is shown with one removably attached changeable cassette 21A on a molding base 23. The molding base 23 shows screw holes 290 for receipt of screws 29 when a second changeable cassette is attached to that base 23. Four additional changeable cassettes 21B,. 21C, and 22A, and 22B are shown unattached to any molding base. The changeable cassettes 21B, 21C, and 22A, and 22B can be exchanged for one of the changeable cassette 21A shown attached to the mold halves 20, or attached to the molding base 23 of mold half 20 where no changeable cassette is presently attached. In this way the molding system can comprise at least one more changeable cassette than the number of changeable cassettes that are removable attached to said first mold half when in use, said changeable cassettes comprising differently shaped inserts.

Figure 5:
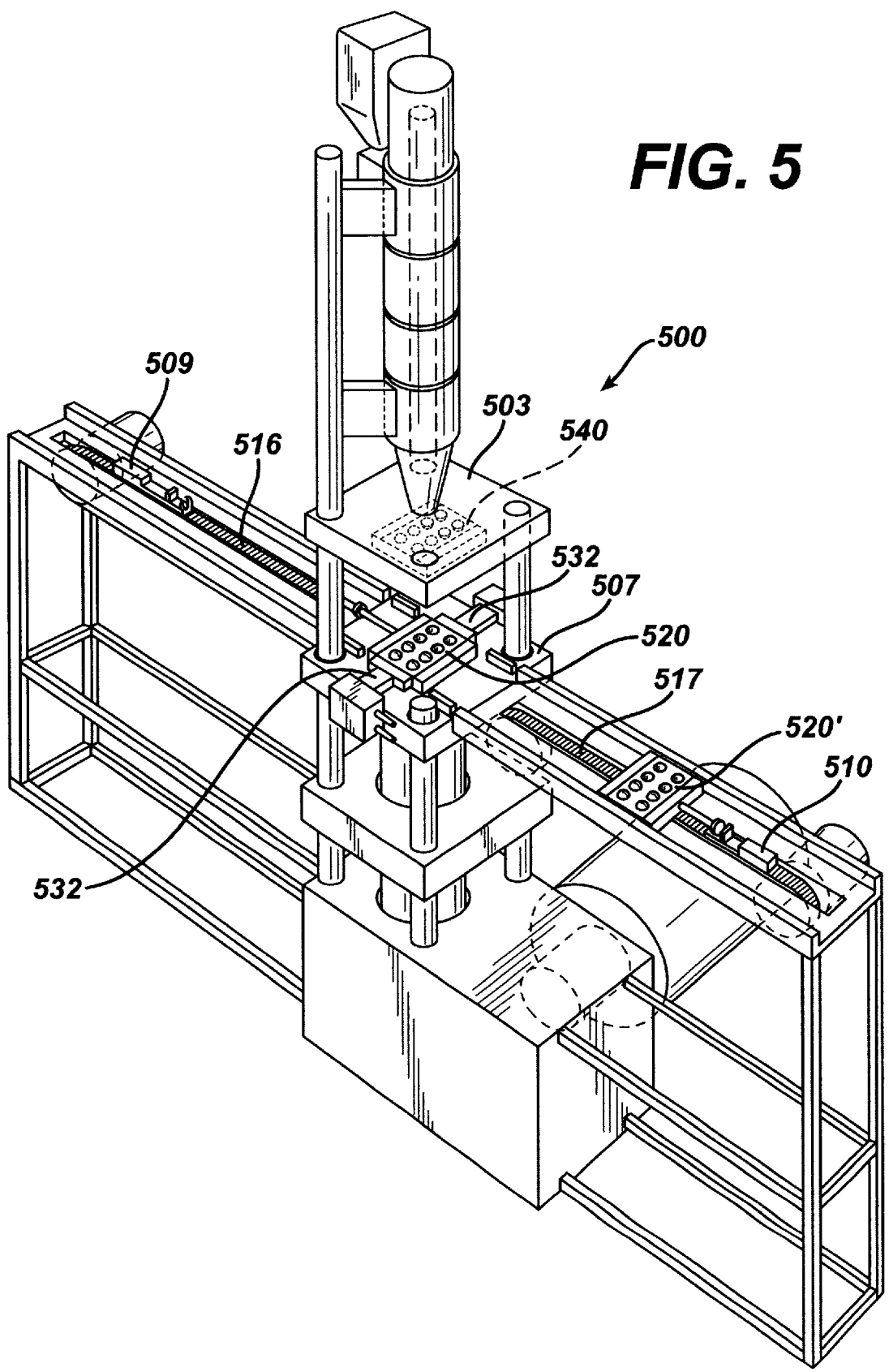
FIG. 5 is a molding system of this invention comprising a vertical injection moldng machine of this invention and interchangeable mold halves.

FIG. 5 shows the preferred injection molding machine 500 and molding system of this invention comprising an injection molding machine in which the mold of this invention is to be used. FIG. 5 also shows a mold in which a plurality of first mold halves can work in conjunction with the same second mold half to make different shaped ophthalmic devices. The preferred injection molding machine is a vertical injection molding machine 500, as described in U.S. Pat. No. 5,451,155. The preferred vertical injection molding machine has a moveable platen 507 onto which a lower mold half 520 is removeably mounted. The moveable platen 507 was referred to as the horizontal table in U.S. Pat. No. 5,451,155. The term moveable platen will be used herein. It is preferred that the lower mold half 520 is a first mold half as described earlier with removeably mounted cassettes. Facing the lower mold half 520 is the upper mold half 540 which is shown in dashed lines in FIG. 5. The upper mold half 540 is preferably a second mold half as described earlier. The upper mold half 540 is removably mounted onto the supporting plate 503. The supporting plate 503 preferably remains stationary at all times. In this embodiment, the lower mold half 520 and the moveable platen 507 move up and down to close and open the mold.

In the preferred embodiment, at least one, preferably two transport means, shown as conveyors 516, 517 provide for the fast exchange of one lower mold half 520 for another lower mold half 520'. Alternatively, the transport means can be a pneumatically, hydraulically, or electrically driven chain. In the presently preferred embodiment, the transport means is hydraulically driven chain. FIG. 5 shows that the lower mold half 520' to be inserted into the molding machine 500 is located on conveyor 517. In the preferred mode both conveyors 516, 517 can insert or remove the mold halves; therefore, the description regarding the action of conveyor 517 can be performed by conveyor 516 and visa versa.

After the mold half 520 in the molding machine has made a specified number of ophthalmic devices, i.e. lens curves, the mold half 520 is automatically unlocked from the moveable platen 507, conveyor 516 attaches itself to the lower mold half 520 via catch means 509, and pulls the mold half 520 off the moveable platen 507, and onto the conveyor 516. In the preferred embodiment the mold half is moved by a hydraulically driven chain, but is supported by a supportive surface and guide rails on either side of the supportive surface. At this time, conveyor 517 which is attached to mold half 520' via catch means 510 pushes the mold half 520' onto the moveable platen 507, and when properly positioned, the mold half 520' locks into place. The mold half is preferably held onto the moveable platen 507 via hydraulic clamps 532. Once the mold half 520' locks into place, the molding machine 500 can begin making the new ophthalmic device(s) using the newly mounted lower mold half 520'. The mold and molding system shown in FIG. 5 comprises lower mold half 520 and lower mold half 520', which can work in conjunction with the same upper mold half 540 to form ophthalmic devices. The time it takes to change one lower mold half 520 for another lower mold half 520' is less than 60 seconds, preferably less than 30 seconds, and most preferably less than 20 seconds.

The fast exchange of one lower mold half 520 for another lower mold half 520' is further aided by having duplicate water and/or air supplies (not shown), preferably both, to at least two lower mold halves 520, 520' so that the water and air connections do not have to be physically moved from one mold half 520 to the other mold half 520' in order to change one lower mold half for another. In the preferred mode, the lower mold half 520 on the moveable platen 507, and the lower mold half 520' on the transport means 517 have duplicate water and air supplies. Further, if desired one or more heating elements (not shown) can be provided to heat the inserts in the lower mold half 520' present on the conveyor 517 prior to inserting the lower mold half 520' into the molding machine. Heating the lower mold half 520' prior to mounting it onto the moveable platen 507, decreases the time it takes for the inserts to reach the optimum molding temperature range. (The inserts in the mold half will require heating at first to reach a temperature within the optimum molding temperature range, but after a few cycles of molding parts the inserts will require cooling to keep them within the optimum molding temperature range.) By preheating the lower mold half 520' present on the conveyor 517, the inserts in the lower mold half can reach the optimum molding temperature range in two or fewer molding cycles, resulting in less down-time, and less waste. The time required for heating the lower mold half 520 is also shortened if only one or both of the cassettes in the lower mold half are changed without removing the lower mold half 520 from the moveable platen 507, and the lower mold half 520 is used to make more ophthalmic devices before it cools. In that embodiment of the invention, the base of the mold half will still be hot and able to transfer heat to one or more of the changed cassettes. If however, the lower mold half 520 is moved off the moveable platen 507, and another lower mold half 520' is used for molding, and one or more cassettes in the lower mold half 520 are changed, there is still the benefit of a faster preheat time than if the entire lower mold half were changed, because the base of the lower mold half 520 will transfer heat to the one or more changed cassettes.

After a mold half change, one or more of the cassettes in the mold half which was just removed from the moveable platen onto a conveyor, may be changed, the entire mold half may be exchanged for another mold half, or the mold half can be later mounted onto the moveable platen again. Both cassettes in the mold half can be changed in less than 6 minutes, more preferably in less than 4 minutes, most preferably in less than 2 minutes. By the time the cassette change is complete, the inserts will be pre-heated, and ready to mount onto the moveable platen 507. Pre-heat preferably takes less than 1 minute. Preferably, there is at least one, most preferably one, lower mold half 520' ready for use present on one of the conveyors 516, or 517 at the time the lower mold half 520 is ready to be removed from the moveable platen 507.

Preferably the moveable platen 507 moves between a lower position (as shown) during which the mold is open and a closed position in which the inserts in the lower mold half 520 contact the inserts in the upper mold half 540, and together the inserts on both mold halves form the cavities into which a molten thermoplastic is injected. After injection and about 0.5 to 1.5 seconds for cooling of the parts, the mold halves separate as air from the air ejector gaps in the upper mold half pushes the front curves and back curves onto the inserts in the lower mold half 520. The moveable platen 507 and lower mold half 520 move to the open position shown in FIG. 5. The molded lens curves are then removed from the lower mold half 520 preferably via a robot. The preferred robot is shown in FIG. 6.

Figure 6:
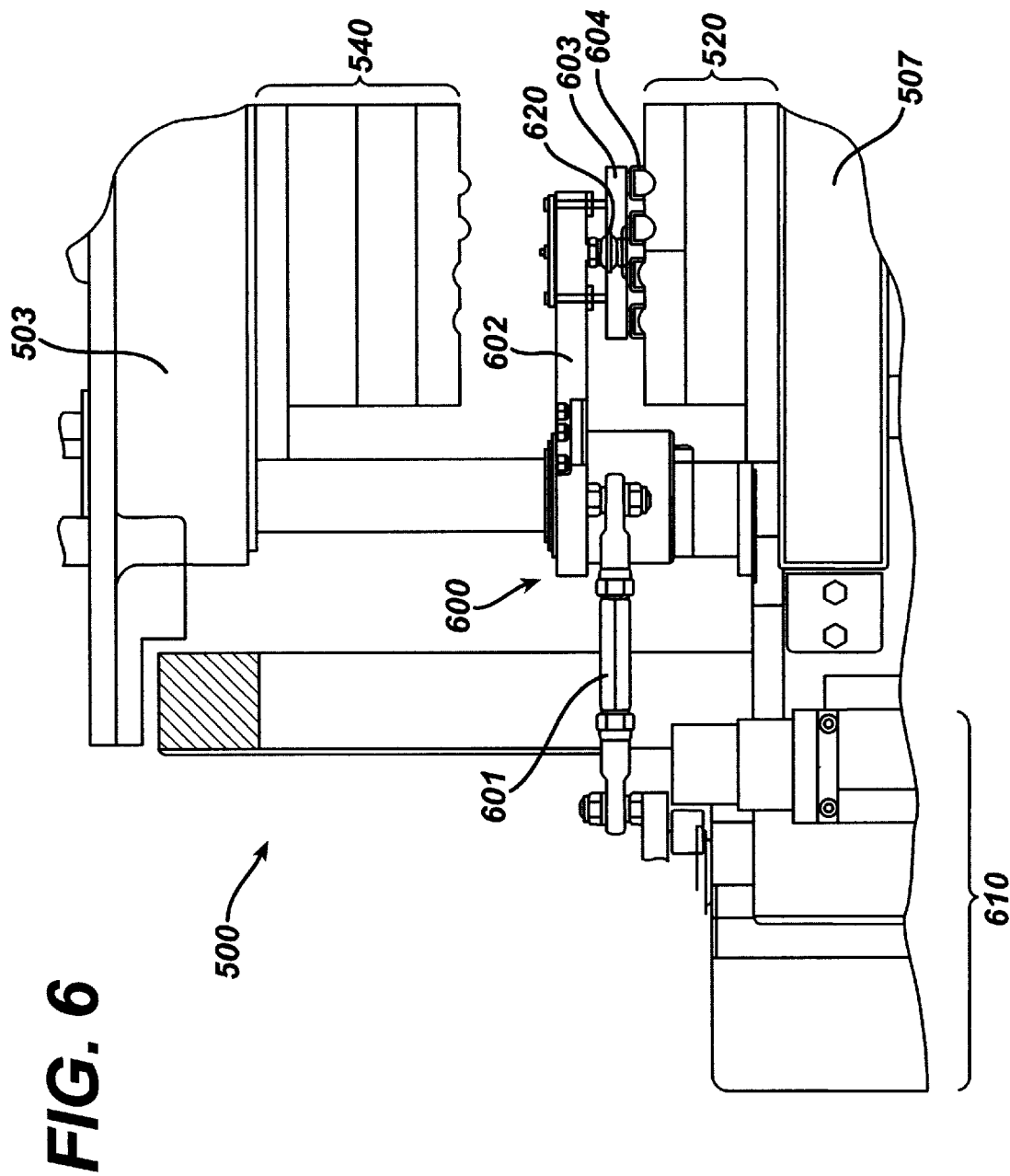
FIG. 6 is an enlarged portion of a vertical injection molding machine of this invention showing the robot arm.

FIG. 6 shows in detail a portion of the preferred injection molding machine 500, and the preferred robot 600. The robot comprises a connecting rod 601, arm 602 and an end of arm tool 603. The robot 600 moves horizontally in between the upper mold half 540 and the lower mold half 520 when the upper mold half 540 and lower mold half 520 are open as shown in FIGS. 5 and 6. The robot 600 moves horizontally in the opposite direction out of the area between the lower mold half 520 and upper mold half 540 when the lower mold half 520 is moved toward the upper mold half 540 to form a closed mold. In the preferred mode, shown in FIG. 6, the robot 600 is a direct drive robot, that is, the drive mechanism 610 for the robot rides up and down with the movement of the moveable platen 507. Through gears and rotatable cogs, e.g., a rack and pinion mechanism (not shown) the robot moves horizontally, that is, it moves in between and out of the mold halves when the mold opens and closes, respectively. The robot is shown inside the open mold, e.g., between the upper mold half 540 and lower mold half 520. After the robot 600 moves horizontally into position between the mold halves, the end of arm tool 603 preferably is lowered close to the surface of the lower mold half 520 (as shown) by vacuum extender 620, which moves the end of arm tool 603 up and down. The vacuum extender 620 is connected to a vacuum source (not shown). (When the vacuum is activated the end of arm tool 603 moves up via contraction of the vacuum extender 620. When the vacuum is deactivated the end of arm tool 603 moves down via extension of the vacuum extender 620.) At this time the lenses are ejected from the lower mold half 520 by the air ejection system. The end of arm tool 603 preferably has cups 604 which are connected to a vacuum source (not shown) which is activated to pick up the air-ejected lens curves (not shown). When the lower mold half 520 moves toward the stationary upper mold half 540, the robot through the preferred direct drive mechanism moves out from between the upper mold half 540 and lower mold half 520, and transfers the front curves and back curves to another robot (not shown) for proper placement on lens curve pallets (not shown), similar to those described in the prior art.

Due to the thinner lens curves and the air ejection, the cycle time of the present invention is less than 6 seconds, more preferably less than 4 seconds, and most preferably from 2 to 3 seconds. The cycle time is the time it takes to go from an open mold, to a closed mold and back to an open mold.

In alternative embodiment the mold of this invention with changeable mold halves and/or changeable cassettes can be used to mold contact lenses by methods described in the prior art, such as in U.S. Pat. No. 5,782,460 and WO/98/42497 incorporated herein by reference. The molds for this embodiment can comprise first and second mold halves at least one of which comprises inserts for forming contact lenses. It is preferred that at least one insert used to make each contact lens is transmissive to radiation for polymerization of the reactive mixture used to make the contact lenses. Suitable insert materials were described above. For this embodiment, at least one of the mold halves, preferably both mold halves, comprise at least one, preferably at least two cassettes comprising inserts for forming contact lenses. When forming contact lenses, all the inserts will provide for optically critical surfaces of the contact lenses. The mold halves and the cassettes are part of a molding system and are readily changeable and can be used in different combinations to produce many SKUs. The mold halves can comprise a base which can take the shape of a frame, support, plate, or the like to which the cassettes are removably attached. The mold halves can be pivotly hinged, or can move apart horizontally or vertically. In this embodiment in which the mold is used to form contact lenses, the molds preferably will not provide for cooling of inserts or air ejection of the contact lenses described earlier. Ejection of the contact lenses from the inserts can be accomplished by soaking the contact lenses in water.

In the preferred mode an identifier, e.g. a radio frequency (RF) chip or the like, may be placed onto each cassette to store information which identifies the ophthalmic devices it forms. The identifier may also be used to track the cassettes. This preferred embodiment is fully described in concurrently filed U.S. Ser. No. 09/305,885, "Method and Apparatus for Lot Tracking and Changeover", VTN-419 incorporated herein by reference. The molding machine preferably comprises a computer which schedules or receives input on which ophthalmic devices are to be made by the machine. Based on this information, the computer determines when a mold or cassette change is needed. At the time of a mold or cassette change, the molding machine will read the identifier on the cassettes to make sure the correct cassettes and/or mold half are in the machine. Based on the ophthalmic devices to be produced by the machine, the process conditions are automatically adjusted for the new ophthalmic devices to be formed. The computer tracks the number of devices made and schedules the next mold or cassette change.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. Substitutions of elements from one described embodiment to another are also fully intended and contemplated. It is also to be understood that the drawings are not necessarily drawn to scale. It is the intention, therefore, to be limited only as indicated by the scope of the claims appended hereto.

What is claimed is:

1. A mold for forming ophthalmic devices comprising:
a first mold half which works in conjunction with a second mold half, wherein said second mold half comprises inserts, and said first mold half comprises a base, attachment means, and at least one changeable cassette removably attached by said attachment means to said molding base, said at least one changeable cassette comprising a surface not in contact with said molding base and inserts, wherein said attachment means are accessible on said surface of said changeable cassette not in contact with said base, and further wherein said inserts in said at least one changeable cassette comprise optical quality surfaces.

2. The mold of claim 1 wherein said first mold half when in use comprises at least two changeable cassettes.

3. The mold of claim 2 wherein said changeable cassettes comprise inserts for the formation of lens curves.

4. The mold of claim 3 wherein said changeable cassettes comprise inserts shaped to form back curves and front curves.

5. The mold of claim 1 wherein said inserts are contact lens forming inserts.

6. The mold of claim 1 wherein said first mold half comprises the inserts for the optically critical surface of said ophthalmic devices, and said second mold half comprises the inserts for the non-optically critical surface of said ophthalmic devices.

7. The mold of claim 6 wherein said first mold half comprises the inserts for the optically critical surfaces of said front curves and back curves.

8. The mold of claim 1 wherein said second mold half comprises at least one changeable cassette comprising said inserts of said second mold half, and said inserts in said first mold half and said second mold half form optically critical surfaces of said ophthalmic devices.

9. The mold of claim 4 wherein said inserts for said optically critical surfaces of said front curves are in a first cassette, and said inserts for said optically critical surfaces of said back curves are in a second cassette, said first and second cassettes being simultaneously attached to said first mold half.

10. The mold of claim 1 wherein said inserts in said at least one changeable cassette are cooled indirectly.

11. The mold of claim 1 wherein said inserts are cooled by contact with a heat transfer block.

12. The mold of claim 1 wherein said ophthalmic devices are ejected from said first mold half or said second mold half by at least one pulse of air.

13. The mold of claim 1 wherein said ophthalmic devices are ejected from said first mold half and said second mold half by at least one pulse of air from each of said first mold half and said second mold half.

14. The mold of claim 13 wherein said inserts in said at least one changeable cassette are cooled indirectly.

15. The mold of claim 1 wherein said ophthalmic devices are removed from said inserts by water.

16. The mold of claim 1 wherein said mold is inserted into an injection molding machine.

17. The mold of claim 16 wherein said injection molding machine is a vertical injection molding machine wherein said first mold half is the lower mold half.

18. The mold of claim 17 wherein said vertical injection molding machine comprises a direct drive robot which picks up said ophthalmic devices.

19. The mold of claim 18 wherein said mold simultaneously forms optical quality front curves and back curves.

20. The mold of claim 16, wherein the cycle time of said injection molding machine is less than 4 seconds.

21. The mold of claim 17, wherein said first mold half is changed with another first mold half in less than sixty seconds.

22. The mold of claim 1 wherein said attachment means are selected from the group consisting of screws, brackets, braces, bolts, quick-clamps, and magnetism.

23. A molding system for forming ophthalmic devices comprising a mold comprising a first mold half and a second mold half, wherein said first mold half comprises at least one changeable cassette, and said molding system further comprises at least one more said changeable cassette than the number of said changeable cassettes that are removably attached to said first mold half when in use, said changeable cassettes comprising differently shaped inserts, and further wherein said inserts in said changeable cassettes comprise optical quality surfaces, and said second mold half comprises inserts that with said inserts in said changeable cassettes define a cavity in which said ophthalmic devices are formed.

24. The molding system of claim 23 wherein said first mold half when in use comprises at least two changeable cassettes.

25. The molding system of claim 23 wherein said first mold half further comprises a base to which said at least one changeable cassette is removably attached.

26. The molding system of claim 25 wherein said changeable cassettes comprise inserts for the formation of lens curves.

27. The molding system of claim 26 wherein said changeable cassettes comprise inserts for the formation of back curves and front curves.

28. The molding system of claim 24 wherein said changeable cassettes comprise inserts for the formation of contact lenses.

29. The molding system of claim 23 wherein said first mold half comprises the inserts for the optically critical surface of said ophthalmic devices, and said second mold half comprises the inserts for the non-optically critical surface of said ophthalmic devices.

30. The molding system of claim 29 wherein said first mold half comprises the inserts for the optically critical surfaces of said front curves and back curves.

31. The molding system of claim 23 wherein said second mold half comprises at least one changeable cassette comprising said inserts of said second mold half, and said inserts in said first mold half and said second mold half form optically critical surfaces of said ophthalmic devices.

32. The molding system of claim 27 wherein said inserts for said optically critical surfaces of said front curves are in a first cassette, and said inserts for said optically critical surfaces of said back curves are in a second cassette, said first and second cassettes being simultaneously attached to said first mold half.

33. The molding system of claim 23 wherein said inserts in said cassettes are cooled indirectly.

34. The molding system of claim 23 wherein said inserts are cooled by contact with a heat transfer block.

35. The molding system of claim 23 wherein said ophthalmic devices are ejected from said first mold half or said second mold half by at least one pulse of air.

36. The molding system of claim 23 wherein said ophthalmic devices are ejected from said first mold half and said second mold half by at least one pulse of air from each of said first mold half and said second mold half.

37. The molding system of claim 24 wherein said inserts in said cassettes are cooled indirectly.

38. The molding system of claim 23 wherein said ophthalmic devices are removed from said inserts by water.

39. The molding system of claim 23 further comprising an injection molding machine onto which said mold is mounted.

40. The molding system of claim 39 wherein said injection molding machine is a vertical injection molding machine and wherein said first mold half is the lower mold half.

41. The molding system of claim 40 wherein said vertical injection molding machine comprises a direct drive robot which picks up said ophthalmic devices.

42. The molding system of claim 41 wherein said mold simultaneously forms optical quality front curves and back curves.

43. The molding system of claim 39, wherein the cycle time of said injection molding machine is less than 4 seconds.

44. The molding system of claim 40, wherein said first mold half is changed with another first mold half in less than sixty seconds.

45. A molding system for forming ophthalmic devices comprising a plurality of first mold halves comprising inserts comprising optical quality surfaces, and a second mold half comprising inserts, and a plurality of cassettes comprising inserts, said cassettes being removably attached to said first mold halves, wherein each of said first mold halves work in conjunction with said second mold half to make different shaped ophthalmic devices, and further wherein said molding system comprises at least one more changeable cassette than the number of said changeable cassettes that are removably attached to said first mold half when in use with said second mold half.

46. The molding system of claim 45 wherein said first mold half when in use comprises at least two changeable cassettes.

47. The molding system of claim 45 wherein said first mold half further comprises a base to which said at least one changeable cassette is removably attached.

48. The molding system of claim 46 wherein said changeable cassettes comprise inserts for the formation of lens curves.

49. The molding system of claim 48 wherein said changeable cassettes comprise inserts for the formation of back curves and front curves.

50. The molding system of claim 45 wherein said changeable cassettes comprise inserts for the formation of contact lenses.

51. The molding system of claim 45 wherein said first mold half comprises the inserts for the optically critical surface of said ophthalmic device, and said second mold half comprises the inserts for the non-optically critical surface of said ophthalmic devices.

52. The molding system of claim 51 wherein said first mold half comprises the inserts for the optically critical surfaces of said front curves and back curves.

53. The molding system of claim 45 wherein said second mold half comprises at least one changeable cassette comprising said inset of said second mold half, and said insets in said first mold half and said second mold half form optically critical surfaces of said ophthalmic devices.

54. The molding system of claim 49 wherein said inserts for said optically critical surfaces of said front curves are in a first cassette, and said inserts for said optically critical surfaces of said back curves are in a second cassette, said first and second cassettes being simultaneously attached to said first mold half.

55. The molding system of claim 45 wherein said inserts in said cassettes are cooled indirectly.

56. The molding system of claim 45 wherein said inserts are cooled by contact with a heat transfer block.

57. The molding system of claim 45 wherein said ophthalmic devices are ejected from said first mold half or said second mold half by at least one pulse of air.

58. The molding system of claim 45 wherein said ophthalmic devices are ejected from said first mold half and said second mold half by at least one pulse of air from each of said first mold half and said second mold half.

59. The molding system of claim 58 wherein said inserts in said cassettes are cooled indirectly.

60. The molding system of claim 45 wherein said ophthalmic devices are removed from said inserts by water.

61. The molding system of claim 45 further comprising an injection molding machine onto which said mold is mounted.

62. The molding system of claim 61 wherein said injection molding machine is a vertical injection molding machine and wherein said first mold half is the lower mold half.

63. The molding system of claim 62 wherein said vertical injection molding machine comprises a direct drive robot which picks up said ophthalmic devices.

64. The molding system of claim 45 in which two different optical quality ophthalmic devices are formed simultaneously.

65. The molding system of claim 61, wherein the cycle time of said injection molding machine is less than 4 seconds.

66. The molding system of claim 61, wherein said first mold half is changed with another first mold half in less than sixty seconds.

* * * * *